US005471727A

United States Patent [19]

Kubota

[11] Patent Number: 5,471,727

[45] Date of Patent: Dec. 5, 1995

[54] POWER OPERATION TYPE TAG PIN FITTING MACHINE

[75] Inventor: Mikio Kubota, Tokyo, Japan

[73] Assignee: Toska Co., Ltd., Tokyo, Japan

[21] Appl. No.: 115,591

[22] Filed: Sep. 3, 1993

[30] Foreign Application Priority Data

Feb. 18, 1993 [JP] Japan .............................. 5-005233 U

[51] Int. Cl.$^{6}$ ................................................ B23P 19/02

[52] U.S. Cl. ............................... 29/235; 29/252; 227/67

[58] Field of Search ........................... 29/235, 268, 252, 29/293.56; 227/65, 67, 68, 119

[56] References Cited

U.S. PATENT DOCUMENTS

| | | | |
|---|---|---|---|
| 3,734,375 | 5/1973 | Bone et al. | 227/67 |
| 4,315,587 | 2/1982 | Ritter et al. | 227/67 |
| 4,497,321 | 2/1985 | Fearing et al. | 29/268 |
| 4,536,933 | 8/1985 | Furutsu | 29/235 |

FOREIGN PATENT DOCUMENTS

| | | |
|---|---|---|
| 64-6108 | 1/1989 | Japan . |
| 4-51421 | 5/1992 | Japan . |
| 5-32238 | 1/1993 | Japan . |

*Primary Examiner*—Robert C. Watson
*Attorney, Agent, or Firm*—Nikaido Marmelstein Murray & Oram

[57] ABSTRACT

A power operation type tag pin fitting machine wherein a hollow needle is protrusively disposed in front of a main body, a push rod for pushing a transverse rod of the hollow needle and a cylinder for driving the push rod are disposed on the axis of the hollow needle, and an operation member having a portion for protecting the hollow needle is so supported as to move back and forth with respect to a machine frame, is so biased by a spring as to protrude forward, and moves back when the hollow needle is punched to pierce through a product during a fitting operation of the tag pin and automatically operates the cylinder at a predetermined position. The tag pin can be fitted to the product by merely putting the main body on the product.

6 Claims, 4 Drawing Sheets

POWER OPERATION TYPE TAG PIN FITTING MACHINE

BACKGROUND OF THE INVENTION

This invention relates to a fitting machine of a tag pin using a pneumatic cylinder as a driving source.

A tag pin of a synthetic resin has been used for fitting a price tag to products such as clothes and bags through which a pin can be penetrated. Such a tag pin includes a head, a filament portion extending perpendicularly from the center of the head in one direction and a transverse rod perpendicularly fixed to the end of this filament portion, and these constituent members are shaped integrally into an H shape. A large number of such tag pins are integrally molded from a synthetic resin such as nylon and propylene as a group of tag pins connected with one another in a comb-tooth shape on a connecting rod.

To put a price tag to products made of a relatively soft material such as clothes by using such a tag pin, it has been customary to punch the tag pin by a manual operation type fitting machine. When a lever retractively disposed at a front part of a grip portion of the fitting machine is pushed, a piston or a push rod operating in the interlocking arrangement with this lever is moved forth, and one of the group of tag pins is separated and is extruded by a hollow needle disposed at the front part of the fitting machine.

However, since the transverse rod is pushed towards the hollow needle by the lever in this manual tag pin fitting machine, fatigue of an operator is great when a large number of tag pins must be punched by the repetition of the punching work. When the products are made of a relatively hard material such as leather products or jeans, the hollow needle cannot easily pierce through the products and a great resistance occurs when the filament portion of the tag pin passes through the hole bored in the product. Accordingly, the pin fitting operation cannot be carried out for a long time using the manual fitting machine.

A power operation type fitting machine for picking the tag pin to such a thick and hard product has been proposed. For example, Japanese Patent Publication No. 4-51421 and Japanese Utility Model Application Kokai Publication No. 1-6108 propose a fitting machine using an electric motor.

The fitting machine using the electric motor as the driving power source is effective for picking the tag pin into the relatively thin and soft product such as the clothes because the operator does not get tired. In the case of the relatively thick and hard products such as the leather products and the jeans, however, a great frictional resistance occurs when the filament portion penetrates through the product and required power becomes great, so that a cell for driving the electric motor is consumed rapidly.

To solve the problem of the fitting machine using the cell as the power source, Japanese Patent Application Kokai Publication No. 5-32238 proposes a fitting machine which uses a pneumatic cylinder as the driving source. This fitting machine becomes elongated by the length of the cylinder and heavier and larger, and is therefore suitable for fitting the tag pin while the fitting machine is fitted to a fitting frame fixed on a fixing bed. Accordingly, the following problems develop when the fitting machine using this pneumatic cylinder as the driving source is applied to a portable type device.

The first problem is that constituent members are disposed linearly and the length of the machine is elongated over the length from the tip of the hollow needle for feeding the transverse rod portion of the tag pin to the air cylinder at the rear part of the machine frame. Accordingly, the machine frame is long and great in size, and it is difficult to pierce the hollow needle, which forwardly protrudes, to the product and to pull a trigger disposed at the grip while holding the machine frame.

The second problem is that the hollow needle is always exposed. Therefore, there is the possibility that this hollow needle injures people or is broken during handling of this large and heavy fitting machine.

The problem described above results from the fact that the fitting machine is large in scale and too heavy, and it cannot be handled easily and speedily. In view of this problem, the present invention provides a fitting machine which is safe, can be easily handled by hand and moreover has high operability, by improving the fitting machine of the air cylinder drive type, that has mainly been used as the fixed type, to be a hand-held type.

SUMMARY OF THE INVENTION

To accomplish the objects described above, the power operation type tag fitting machine according to the present invention includes a hollow needle protruding forward from an upper part of a machine frame, a push rod for pushing a transverse rod of a tag pin and a cylinder for driving this push rod on the axis of the hollow needle, and an operation member having a portion for protecting the periphery of the hollow needle and so supported as to move back and forth with respect to the machine frame, the operation member being biased by resilient force in such a manner as to protrude forward, moved back after the hollow needle is pushed to pierce through a product during the fitting operation of the tag pin, and automatically operating the cylinder at a predetermined position.

In the fitting machine according to the present invention, the operation member moves back when the hollow needle disposed at the tip of the machine frame pierces through the product along with price tag put on the product, and this operation member operates a control valve so as to automatically drive a cylinder. Accordingly, this cylinder does not need any trigger that is to be manually operated, and the tag pin can be picked into the product by merely putting the fitting machine on the product. Therefore, even a heavy and large fitting machine can be operated easily. This operation member is allowed to protrude by the resilient force when the push force of the machine frame is reduced, and the hollow needle can be automatically pulled out from the product.

DESCRIPTION OF THE PREFERRED EMBODIMENTS

Figure 1:
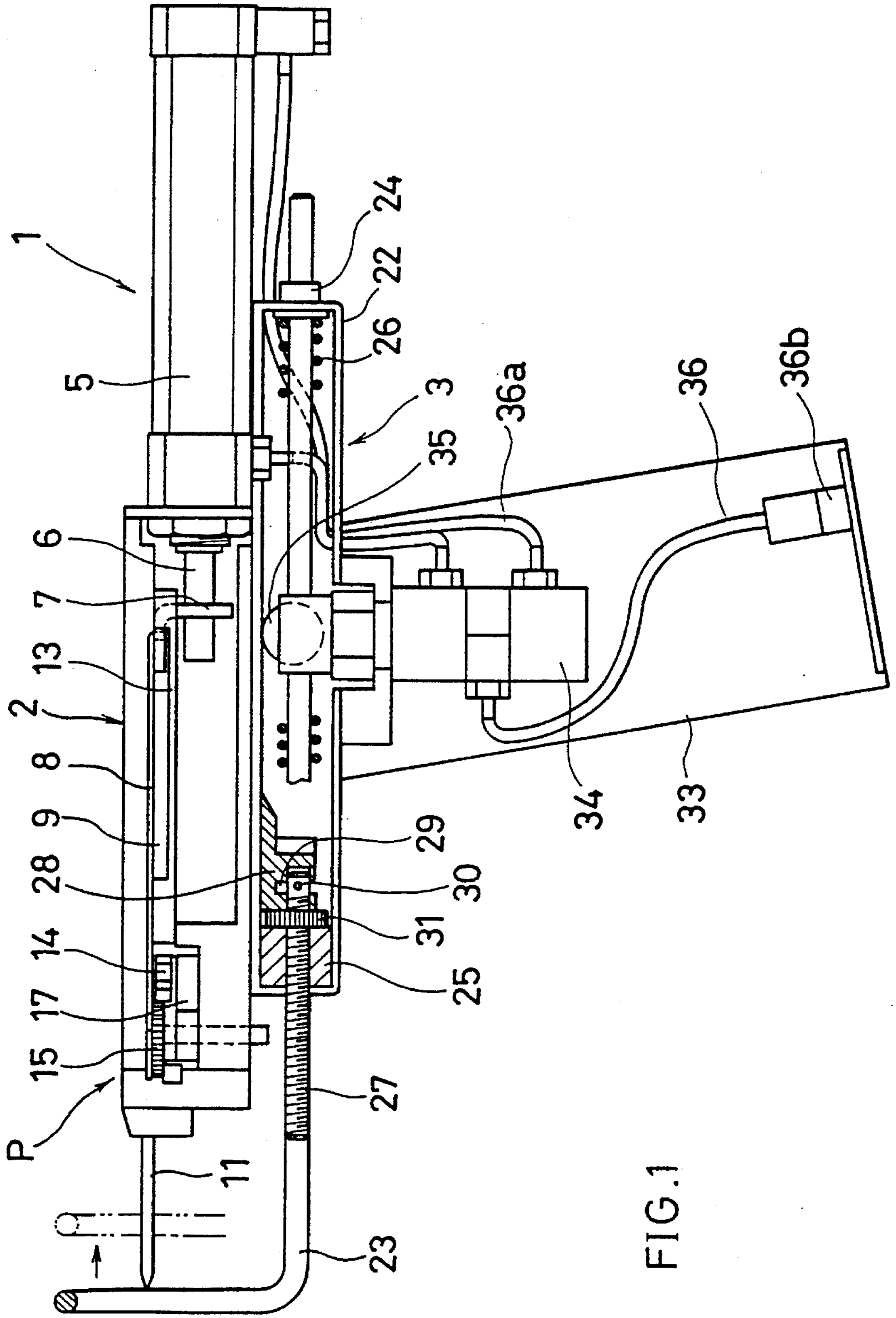
FIG. 1 is a partly cut-away side view of a power operation type tag pin fitting machine according to the present invention.

FIG. 1 is a partly cut-away side view of a power operation type tag pin fitting machine. A main body of this fitting machine 1 is divided into two parts, that is, an upper structure 2, and a lower structure 3 for supporting this upper structure.

Figure 2:
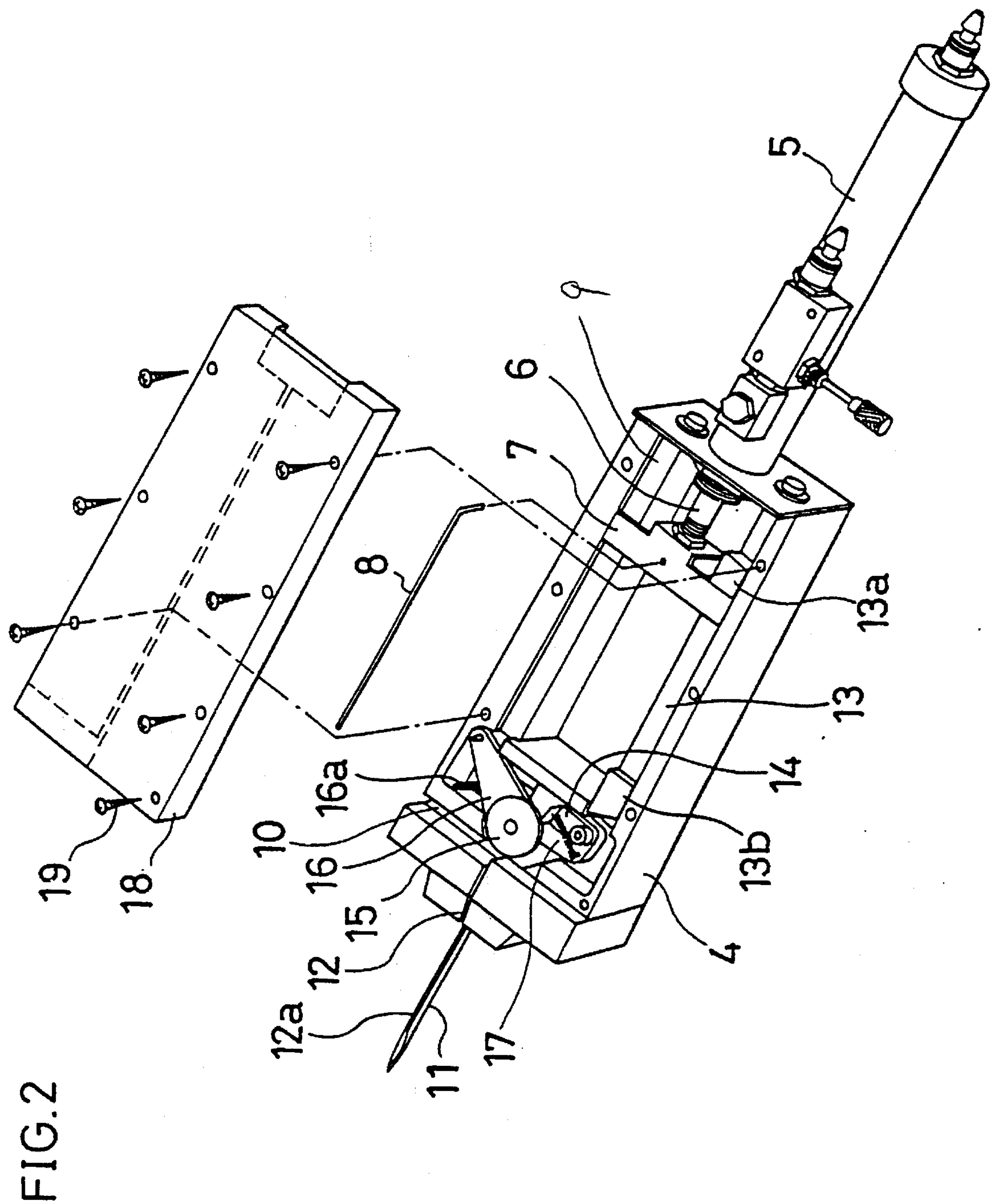
FIG. 2 is a perspective view showing a schematic structure of the inside of an upper structure of the tag pin fitting machine under an exploded state.

The upper structure 2 employs a device utilizing a pneumatic cylinder described in Japanese Patent Kokai Publication No. 5-32238 as a driving source. As shown in FIG. 2, a cylinder 5 is disposed at a rear part of the main body 4 and guide plate 7 is fitted to the distal end of a piston rod 6 of this cylinder 5. A push rod (piston) 8 is fitted to the guide plate 7, and is allowed to advance with the guide plate 7 while the guide plate 7 is guided by guide portions 9 formed on both sides of the main body 4. Though not shown in the drawings, a group of tag pins are loaded into a guide groove 10 defined at a front part of the main body 4. The foremost one of the group of tag pins is pushed out in such a manner that a transverse rod thereof penetrates through a hollow needle 11 piercing the back of a product.

In other words, the end part of the transverse rod of one of the tag pins, which is separated from the group of tag pins, is pushed by the push rod 8 and penetrates through the hollow needle 11. Then, it escapes from an expansion portion at the front side part of the hollow needle 11 and returns to its original shape (T shape) due to flexibility of a filament portion. A part of this filament portion passes through a groove 12 opened in the main body 4 during the picking operation and advances while pulling its head under a protruding state from a groove 12*a* at the side portion of the hollow needle 11. When the transverse rod pierces through the back of the product, the tag pin escapes from the hollow needle 11 and anchors a price tag to the surface of the product.

The guide plate 7 engages with a cam plate 13 which is slidably disposed on the side part of the main body 4, engages with the protruding portion 13*a* at the rearmost end portion to thereby push back the cam plate 13, and further engages with the protruding portion 13*b* at the foremost end portion to thereby push a swing plate 17 and to move forth a pawl (ratchet) 14 pivotally supported on this wing plate 17. The ratchet 14 and a ratchet wheel 15 move forth while engaging with each other, but when the swing plate 17 returns to the original position when the cam plate 13 moves back, the ratchet wheel 15 is simultaneously rotate counter-clockwise and is allowed to advance by a predetermined angle.

The root part of this ratchet wheel 15 is pivotally supported by the distal end of a lever 16 which is in turn pivotally supported by the main body 4, and the swing plate 17 described above is pivotally supported by the shaft of this ratchet wheel 15. The lever 16 is biased by a spring 16*a* in such a manner as to incline forward and operates in such a manner as to allow the ratchet wheel 15 to push, or engage with, the transverse rod of the tag pin. A cover 18 is used to close the opening on the upper surface of the main body 4 by screws 19.

The detailed structure 2 of this upper structure is described in the afore-mentioned Patent Publication. Therefore, the detailed explanation will be omitted. In short, a picking mechanism constituting the upper structure is an excellent mechanism capable of easily picking the group of tag pins implanted on a connecting rod with different pitches.

Figure 3:
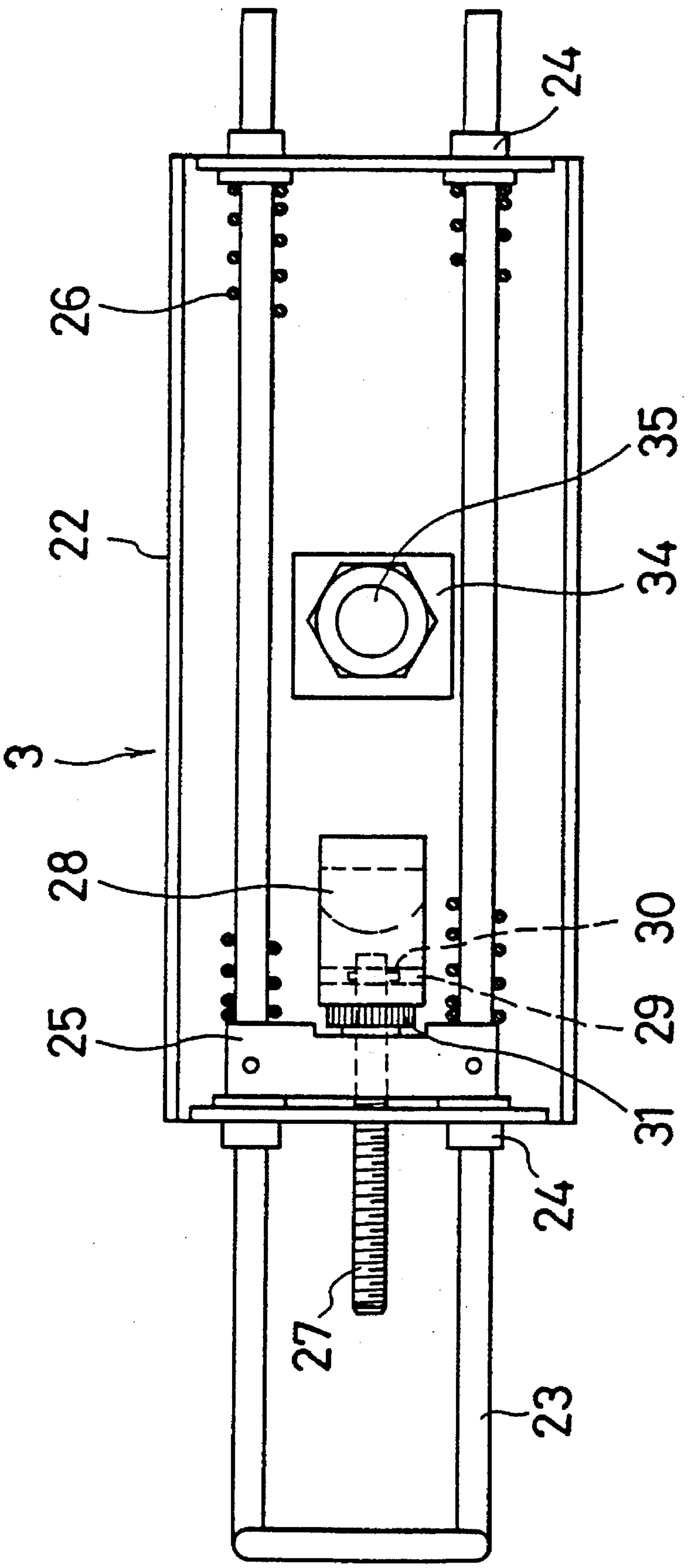
FIG. 3 is a plan view showing a lower structure of the tag pin fitting machine.

As shown in the side view of FIG. 1 and the plan view of FIG. 3, the lower structure 3 first includes an operation body 23 which is shaped by bending a metal rod into a U shape when viewed on the plan and into an L shape when viewed from the side, so as to extend in the longitudinal direction of its main body 22. The front and rear end portions of this operation body 23 are so supported by a bearing 24 as to be capable of sliding back and forth. A spring 26 is interposed between a stopper 25, which is fixed to this operation body 23, and the main body 22 so that the operation body 23 protrudes forward by flexibility of this spring 26.

This operation body 23 has the functions of protecting the hollow needle 11 and operating a control valve 34. Preferably, the operation body 23 is shaped in such a manner that the portion thereof positioned at the distal end of the hollow needle 11 has a U-shape when viewed from the front or a ring shape, or has a U-shape so that it is positioned at the distal end portion and on both side portions.

A screw rod 27 is meshed with the central part of the stopper 25, and an engagement member 28 is fitted to the end of the screw rod 27. A pin 30 fixed to the screw rod 27 is fitted into a groove 29 defined in this engagement member 28, and when a nut 31 fixed to this screw rod 27 is rotated, the engagement member 28 can move back and forth with respect to the stopper 25.

The control valve 34 described above is disposed inside a group 33 disposed beneath the main body 22, and a ball 35 is stored at the end of a spool of this control valve 34. The engagement member 28 described above engages with this bill 35, pushes the spool and operates the cylinder 5. A feed pipe 36 of compressed air and a communicating pipe 36*a* with the cylinder 5 are connected with this control valve 34. Incidentally, the connection position of the communicating pipe 36*a* is different between FIG. 1 and FIG. 2, this illustration is merely for the sake of explanation. In the actual apparatus, therefore, design is made so that the communicating pipe 36*a* and the cylinder 5 are connected with the minimum possible distance therebetween.

In this embodiment, the main body of the tag pin fitting machine is divided into the upper structure 2 and the lower structure 3, and both of them are assembled as shown in FIG. 1, in order to facilitate assembly and disassembly. When the main body is produced by a molded article of a synthetic resin, for example, it is more practical to integrate them.

Next, the operation method of the power operation type tag pin fitting machine according to the present invention will be explained. First, the feed pipe of compressed air is connected to the coupling 36*b* at the lower end of the grip 33 shown in FIG. 1, and the group of tag pins is loaded in a longitudinal direction to the portion represented by symbol P in FIG. 1 as the guide groove 10 shown in FIG. 2. In this way, the picking operation is prepared.

Next, the price tag is put on a predetermined position of the product, and the hollow needle 11 the tip of which is protected by the front part of the operation body 23 is pierced into the product. In this instance, the operation body 23 moves back as it is pushed by the product, but after it moves back by a predetermined distance, the engagement member 28 then operates the control valve 34 through the ball 35. The operation of this control valve 34 supplies compressed air through the communicating pipe 36*a*, and the cylinder 5 is operated. Accordingly, the push rod 8 is moved forth with the guide plate 7 fixed to the tip of the piston rod 6 and one tag pin is picked through the hollow needle 11. After this picking operation is completed, the push force to the product is reduced and then the operation body 23 is returned to the original position by the spring 26. At this time, the control valve 34 is changed over and the piston of the cylinder 5 moves back. Consequently, the push rod 8 connected to the guide plate 7 fixed to the tip of the cylinder rod 6 moves back to the predetermined position.

When the protruding portion 13*b* of the cam plate 13 is pushed by the guide plate 7 during the picking operation of the tag pin, the swing plate 17 is swung forward, and the ratchet 14 pivotally supported by the swing plate 17 is caused to advance. When the picking operation of the tag pin is completed and the guide plate 7 moves back with the piston, the guide plate 7 comes into contact with the protruding portion 13*a* and moves back the cam plate 13. The swing plate 17 returns to its original position due to flexibility of the spring 16*a* with the backward movement of this cam plate 13. Since the ratchet wheel 15 engages with the ratchet 14 at this time, it advances by a predetermined angle, and transfers the group of tag pins meshing with this ratchet wheel 15.

The operation body 23 is so biased by the spring 26 as to protrude forward. During the picking operation of the tag pin, it moves back against the force of the spring 26 and operates the control valve 34. However, when the push force for pushing the fitting machine 1 to the product is reduced, the operation body 23 moves forth due to the force of the spring 26 and pulls out the hollow needle 11 from the product. In this way, the label attaching operation is completed. In other words, according to the fitting machine 1 of the present invention, the pull-out operation of the hollow needle 11 can be carried out substantially automatically.

Figure 4:
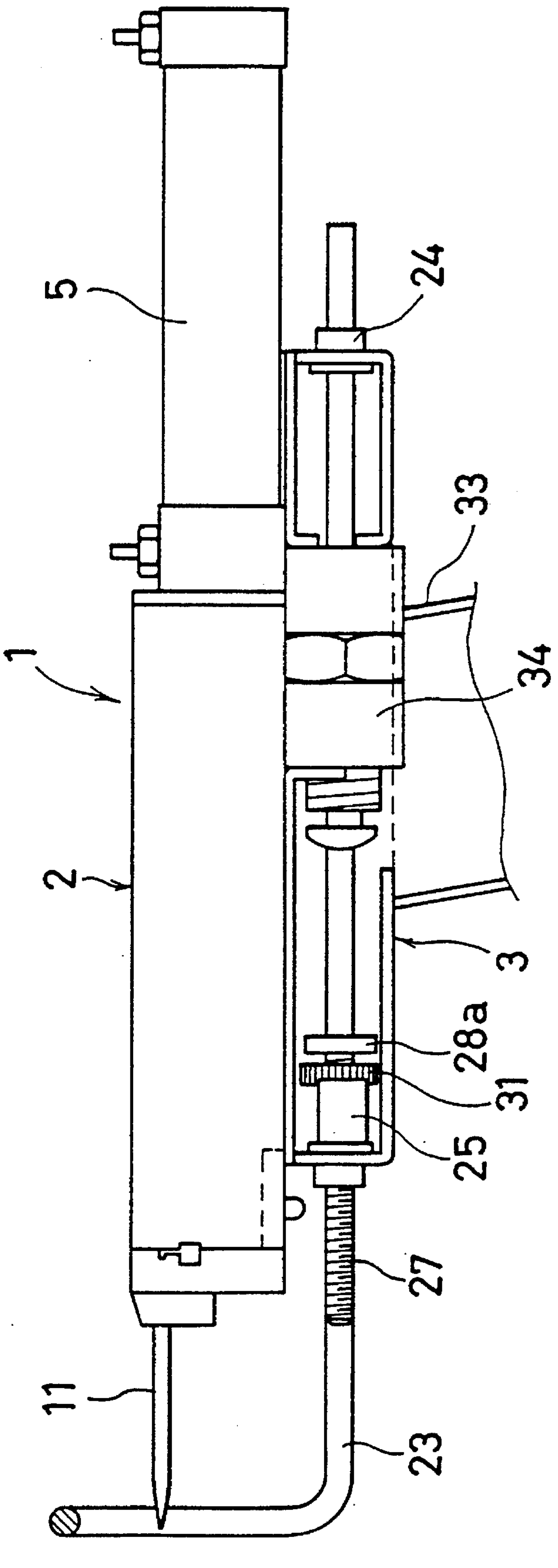
FIG. 4 is a partly cut-away side view of a power operation type tag pin fitting machine according to another embodiment of the present invention.

FIG. 4 is a side view showing the principal portions of the fitting machine 1 of another system. In this embodiment, the cylinder 5 is operated by bringing the engagement member 28*a* supported by the screw rod 27 at the center of the stopper 25 with the control valve 34 being positioned transversely into contact with the head portion 34*a*. Since the control valve 34 is disposed outside the grip 32 in this way, the design of the grip 32 can be changed in various ways and its size can be reduced.

The power operation type tag pin fitting machine according to this embodiment includes the push rod 8 for pushing the transverse rod of the tag pin and the cylinder 5 for driving this push rod 8 on the axis of the hollow needle 11 disposed in front of the upper structure 2. Further, the operation member 23 having the portion for protecting the periphery of the hollow needle 11 in front of the upper structure 2 is provided to the upper structure 2 in such a manner as to be capable of moving back and forth and swinging, and is biased forward by the force of the spring 26. When this operation member 23 moves back to a predetermined position, the operation member 23 operates the cylinder 5 so that the tag pin can be automatically picked.

Accordingly, when the hollow needle 11 at the tip of the fitting machine 1 is put on the price tag and is punched to pierce through the product, the operation member 23 moves back and operates the control valve [24→34] to thereby operate the cylinder 5. Accordingly, this cylinder 5 does not require a lever to be manually operated, and the tag pin can be picked by merely putting the fitting machine on the product.

What is claimed is:

1. A power operation type tag pin fitting machine characterized in that a hollow needle is protrusively disposed in front of a main body, a push rod for pushing a transverse rod of said tag pin and a cylinder for driving said push rod are disposed on the axis of said hollow needle, and an operation member having a portion for protecting said hollow needle is so supported as to move back and forth with respect to a machine frame, is so biased by a spring as to protrude forward, and constitutes a trigger mechanism so that when said hollow needle is punched to pierce through a product during a fitting operation of said tag pin, it moves back and automatically operates said cylinder at a predetermined position;

the operation member has a leading end position, which forms a protective part for the hollow needle; and the operation member is provided at its trailing end with an engagement member for operating the control valve of the cylinder.

2. A power operation type tag pin fitting machine including:

a main body comprising an upper structure and a lower structure in combination;

a hollow needle disposed in front of said upper structure;

a push rod for pushing a transverse rod of a tag pin and a cylinder for driving said push rod on the axis of said hollow needle; and an operation member having a portion for protecting said hollow needle in front of said lower structure, being so supported as to be capable of moving back and forth and allowed to protrude by force of a spring so that when said operation member is moved back to a predetermined position against the force of said spring, said operation member operates a valve which operates said cylinder to pick said tag pin.

3. A power operation type tag pin fitting machine according to claim 1, wherein said operation member is rod-like and is so shaped as to protect a tip of said hollow needle under a state where it protrudes in front of said main body due to the force of said spring.

4. A power operation type tag pin fitting machine according to claim 3, wherein said operation member comprises a portion for protecting the periphery of a front portion of said hollow needle and a portion supported by said main body.

5. A power operation type tag pin fitting machine according to claim 1, wherein an engagement member for operating said control valve is disposed on said operation member in such a fashion that a position thereof can be adjusted back and forth, and a position for operating said control valve can be adjusted by adjusting the front or rear position of said engagement member.

6. A power operation type tag pin fitting machine according to claim 1, wherein said operation member is so biased by said spring as to protrude in front of said main body and pulls out said hollow needle from said product by utilizing the force of said spring after picking of said tag pin.

* * * * *